United States Patent [19]

Pezzoli

[11] Patent Number: 4,696,200
[45] Date of Patent: Sep. 29, 1987

[54] COMPOSITE GEARWHEEL STRUCTURE FOR THE CONTROL OF GRIPPER-CARRYING STRAPS IN WEAVING LOOMS

[75] Inventor: Luigi Pezzoli, Leffe, Italy
[73] Assignee: Vamatex S.p.A., Villa Di Serio, Italy
[21] Appl. No.: 790,483
[22] Filed: Oct. 23, 1985

[30] Foreign Application Priority Data

Oct. 26, 1984 [IT] Italy .............................. 23626/84[U]

[51] Int. Cl.$^4$ ............................................. F16H 3/22
[52] U.S. Cl. ....................................... 74/434; 74/439; 74/457; 474/161
[58] Field of Search ................ 74/434, 439, 446, 449, 74/448, 437, 457, 460, 464, 61; 29/159.2; 474/161

[56] References Cited

U.S. PATENT DOCUMENTS

| | | | |
|---|---|---|---|
| 1,897,865 | 2/1933 | Seifert | 74/460 |
| 2,179,967 | 11/1939 | Thompson | 74/460 |
| 2,720,119 | 10/1955 | Sherman | 74/460 |
| 2,764,900 | 10/1956 | Warsmith | 74/460 |
| 3,469,465 | 9/1969 | Bebbington et al. | 74/439 |
| 3,469,467 | 9/1969 | Seaman | 74/439 |
| 3,469,468 | 9/1969 | Cozzarin et al. | 74/439 |
| 3,504,562 | 4/1970 | Hirych | 74/448 |
| 3,590,456 | 7/1971 | Seaman | 74/439 X |
| 3,730,009 | 5/1973 | Mead et al. | 74/439 X |
| 3,733,921 | 5/1973 | Carveth | 29/159.2 |
| 4,472,164 | 9/1986 | Pusch et al. | 74/343 X |

Primary Examiner—Cornelius J. Husar
Assistant Examiner—Joseph A. Fischetti
Attorney, Agent, or Firm—Young & Thompson

[57] ABSTRACT

A composite gearwheel structure for reciprocating the gripper-carrying straps in weaving looms, comprises a gearwheel body of synthetic plastic material. Its teeth are partially covered with sheet metal associated with the body and forming an integral part thereof.

2 Claims, 3 Drawing Figures

U.S. Patent    Sep. 29, 1987    4,696,200
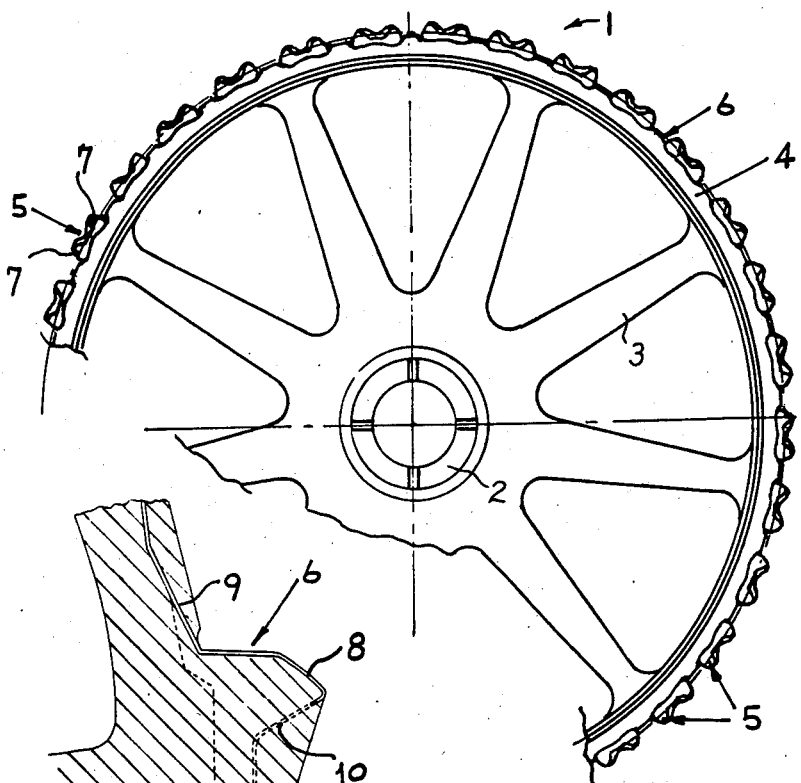
Fig. 1
Fig. 3
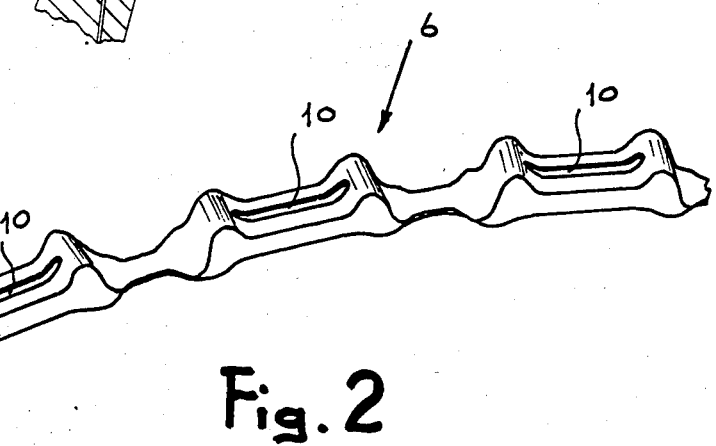
Fig. 2

COMPOSITE GEARWHEEL STRUCTURE FOR THE CONTROL OF GRIPPER-CARRYING STRAPS IN WEAVING LOOMS

BACKGROUND OF THE INVENTION

The present invention relates to an improved composite gearwheel structure to control the advancement of gripper-carrying straps in weaving looms.

It is known that modern weaving machines are frequently faced—due to the very high speeds and the consequent strong inertias involved—with fairly serious problems in respect of wear of the gripper-carrying straps and of the gearwheels controlling their to-and-fro movements inside the shed. These problems have been addressed for some time, mainly through a careful study of the geometries of the gearwheel teeth and of the strap slits engaging therewith on either side, and by appropriate choices of the materials used for producing the gearwheels and the gripper-carrying straps. In spite of this, the solutions adopted so far are not fully satisfactory, as the wears are still very great.

At present, gearwheels—requiring dimensional stability, wear resistance, lightness and high rigidity—are produced with light alloys or with synthetic plastic materials of various types, while the straps are generally produced as composite structures, obtained by associating laminated plastic with rolled sections.

On the other hand, composite structures for the gearwheels controlling the advancement of gripper-carrying straps have never been studied or realized.

SUMMARY OF THE INVENTION

The present invention addresses and solves the aforementioned problems by supplying an improved composite gearwheel structure for advancement of the gripper-carrying straps in weaving looms.

Said structure is characterized in that it comprises a gearwheel body of synthetic plastic material, having its teeth partially covered with sheet-metal being associated with the body so as to form an integral part thereof. Said structure is formed by injection of synthetic plastic material into a mold for the gearwheel body, with previous introduction, onto the bottom of said mold, of a sheet-metal crown, adapted to form the partial covering for said teeth.

Preferably, said sheet-metal crown comprises a plurality of hollow elements provided with intermediate ports, which copy the profile of the teeth ends of the gearwheel body, and a plurality of substantially flat, doubly tapered fillets between said elements.

BRIEF DESCRIPTION OF THE DRAWINGS

The invention is now described in further detail, solely by way of example, with reference to the accompanying, drawings which show a preferred embodiment thereof, and in which:

FIG. 1 is a partial view of the gearwheel according to the invention;

FIG. 2 is a perspective view showing part of the sheet-metal crown which is applied, in the composite structure of FIG. 1, to the plastic gearwheel body; and FIG. 3 is a very enlarged sectional view, taken perpendicular to the gearwheel axis, and through a median plane of the gearwheel showing how—in the composite structure of FIGS. 1 and 2—the plastic body cooperates with the sheet-metal crown, according to the invention.

DESCRIPTION OF THE PREFERRED EMBODIMENT

As shown in the drawing, the gearwheel structure according to the invention comprises a gearwheel body 1 of suitable synthetic plastic material, having a metal hub 2, spokes 3 and a peripheral crown 4, externally provided with teeth 5 of appropriate shape (having two projecting ends and an intermediate recessed zone). With this body there is associated—in the composite structure of FIG. 1—a sheet metal crown 6 (FIG. 2), obtained by pressing and applied on the periphery of the crown 4 of the gearwheel body 1, so as to guarantee the partial covering of the teeth 5 on the projecting end zones 7.

The pressed sheet-metal crown 6 is applied to the body 1 when this latter is molded, by being arranged at the bottom of the mold into which the plastic material is injected. Said crown comprises a plurality of hollow elements 8, which copy the profile of the ends of the teeth 5 and are kept together by substantially flat, doubly tapered fillets 9. The hollow elements 8 are provided with intermediate longitudinal ports 10 between the two protuberances corresponding to the teeth ends being copied by said elements.

When, after arranging the crown 6 the mold, plastic material is injected therein to form the body 1, the injected product fills the cavity of said mold and, at the same time, stably connects the sheet-metal crown 6 to the body 1, thereby forming the composite gearwheel according to the invention of which said crown 6 forms an integral part.

To obtain a stable and efficient connection, the injected material is expelled through the ports 10 to form, at 11, the recessed intermediate non-covered portion of the teeth 5 (of which the protuberances of the elements 8 form instead the covering for the ends), and between the tapered zones of the fillets 9, to form the non-covered periphery of the gearwheel between one tooth 5 and the next.

This structure results in a gearwheel for the advancement of the gripper-carrying straps in weaving looms which, while providing very high wear resistance thanks to the sheet-metal covering of the teeth working parts, also has excellent qualities of lightness, the sheet-metal being very thin, and acquires high rigidity and dimensional stability, in that the actual sheet-metal totally envelops the periphery of the gearwheel body and is integrated therewith, so as to limit its deformations deriving from mechanical stresses as well as from temperature changes. In this respect, the structure according to the invention has some evident advantageous differences in respect of the solutions which provide for the mere addition, to a gearwheel body of synthetic plastic material, of a self-resisting metal crown for engagement with the straps. This would in fact involve far higher weights and dimensions, compared to the solution according to the invention. As regards wear resistance, rigidity and stability, it should also be noted that the results could be improved by arranging for the sheet-metal to be associated with other materials or to be subjected to thermal treatments. For instance, the sheet-metal can advantageously be a suitably chromium plated sheet-steel.

It is understood that any other solutions to the problem being at the basis of the present invention, which are apt to obtain the same advantages as that heretofore described and illustrated, fall within the protection scope of the invention itself. Hence, the connection between the sheet-metal crown and the gearwheel body may be obtained by undercuts, apertures, hooks and similar means, other than those adopted in the gearwheel illustrated on the accompanying drawing. It is also understood that the sheet-metal could be provided for covering only one sector or only some sectors of the gearwheel, instead of the whole periphery thereof.

I claim:

1. Composite gearwheel having a plastic, circular gearwheel body comprising a peripheral portion having a plurality of radially outwardly projecting gear teeth disposed at regular intervals on said peripheral portion, each said tooth defining at least one summit and each two adjacent said teeth defining a recess therebetween; and a continuous metal strip disposed on and coextensive with said peripheral portion, said metal strip covering each said summit of said plurality of plastic gear teeth, said metal strip being embedded in and encased by said plastic peripheral portion radially inwardly of each said recess, said peripheral portion and said teeth having a same and constant thickness; said strip having a width substantially equal to and coextensive with said constant thickness at each said summit; said strip having a width less than said constant thickness and axially recessed from said peripheral portion, radially inwardly of each said recess.

2. Composite gearwheel having a plastic, circular gearwheel body comprising a peripheral portion having a plurality of radially outwardly projecting gear teeth disposed at regular intervals on said peripheral portion, each said tooth defining at least one summit and each two adjacent said teeth defining a recess therebetween; and a continuous metal strip disposed on and coextensive with said peripheral portion, said metal strip covering each said summit of said plurality of plastic gear teeth, said metal strip being embedded in and encased by said plastic peripheral portion radially inwardly of each said recess, each of said plurality of teeth comprising two summits defining a depressed region therebetween, said strip being embedded in and encased by each said tooth in said depressed region, said strip comprising a central slit disposed circumferentially of said gearwheel, said slit being substantially coextensive with said depressed region.

* * * * *